United States Patent [19]

Eke

[11] Patent Number: 4,929,013

[45] Date of Patent: May 29, 1990

[54] AIRFLOW DEFLECTOR APPARATUS

[75] Inventor: Alan B. Eke, Menomonie, Wis.

[73] Assignee: Lund Industries, Inc., Coon Rapids, Minn.

[21] Appl. No.: 372,034

[22] Filed: Jun. 27, 1989

[51] Int. Cl.⁵ .............................................. B60T 1/20
[52] U.S. Cl. .................................... 296/91; 296/180.5
[58] Field of Search ............................. 296/91, 180.5; 180/68.6

[56] References Cited

U.S. PATENT DOCUMENTS

| 300,918 | 5/1889 | Turner | D12/190 |
|---|---|---|---|
| 2,757,954 | 8/1956 | Hurley | 296/91 |
| 3,695,674 | 10/1972 | Baker | 296/180.1 |
| 4,043,587 | 8/1977 | Giallourakis et al. | 296/91 |
| 4,052,099 | 10/1977 | Lowery | 296/91 |
| 4,063,773 | 12/1977 | Modesette | 296/91 |
| 4,159,845 | 7/1979 | Bratsberg | 296/91 |
| 4,262,954 | 4/1981 | Thompson | 296/91 |
| 4,471,991 | 9/1986 | Matthias | 296/91 |
| 4,627,657 | 12/1986 | Daniels et al. | 296/91 |
| 4,776,627 | 10/1988 | Hutto et al. | 296/91 |

FOREIGN PATENT DOCUMENTS

| 1096819 | 6/1955 | France | 296/91 |
|---|---|---|---|
| 1121035 | 7/1956 | France | 296/91 |
| 734743 | 8/1955 | United Kingdom | 296/91 |

Primary Examiner—Dennis H. Pedder
Attorney, Agent, or Firm—Merchant, Gould, Smith, Edell, Welter & Schmidt

[57] ABSTRACT

A wind deflector for boosting debris over an automotive windshield is pivotally mounted at the front edge of an automotive hood. The rotational position of the deflector may be adjusted between an open or erect position and a closed position where the deflector is collapsed against the hood of the vehicle.

4 Claims, 2 Drawing Sheets

AIRFLOW DEFLECTOR APPARATUS

BACKGROUND OF THE INVENTION

The present invention relates to a vehicle mounted wind deflecting screen, and more particularly to an articulated deflector which may be adapted to a variety of vehicles. The deflector may be position in an open or erected position, a collapsed or closed position, or an intermediate position.

A variety of wind deflector devices have been adopted for use on the front end of an automobile for paint protection and for preventing the accumulation of road debris on the windshield.

Examples of this prior art include, U.S. Pat. 4,052,099 to Lowery et al. The Lowery patent teaches the use of dual air spoilers mounted in a spaced apart fashion. The dual air spoilers are mounted to the hood of a vehicle through the use of four bendable brackets which permit the air spoiler panels to be attached to any of a variety of vehicles.

U.S. Pat. No. 4,159,845 to Bratsberg also teaches an accessory mounted along the front of an automotive vehicle to deflect air over the top of the vehicle. Bratsberg also includes a baffle which is pivotally mounted. The baffle itself is automatically adjustable according to the speed of the vehicle. The louver is controlled in part by a compression spring which forms an airflow actuator.

An adjustable deflector for reducing drag is disclosed in U.S. Pat. No. 4,262,954 to Thompson. This device teaches the use of a releasably fastened deflector plate with a smooth continuous curve for directing airflow toward the roof of the vehicle.

SUMMARY OF THE INVENTION

In contrast to this prior art, the airflow deflector structure of the present invention is formed as a pair of cooperating wings which are mounted to the vehicle through the use of a single center hinge structure and a pair of laterally disposed side hinges. The laterally disposed side hinges permit longitudinal movement of the wings. This longitudinal movement is required to permit the wings to rotated about pivot points located on the center hinge as the deflector is moved from a collapsed position in substantial conformity with the hood, to an erected position to deflect airflow over the hood.

The wing structures are pivotally retained by the center hinge. The center hinge itself is mounted on the hood through the use of a center hinge mounting bracket which allows the center hinge to pivot. As the center hinge is rotated through its range of motion the wing members rotate about a pivot structure provided in the center hinge support structure.

The lateral motion of the wings which is caused by the rotation of the center hinge over a curved surface such as the nose of the vehicle may be compensated for by compliance of the side hinge structures.

The adoption of the articulated wings permits the airflow deflector apparatus to be readily adapted to a variety of vehicle designs.

The design also permits the deflector to be collapsed into substantial conformity with the hood when the deflection of airflow is not required. Clamping structures may be provided in conjunction with the center hinge to secure the deflector in the open, closed or some intermediary position.

The structures depicted in drawing are illustrative of the invention and other methods of carrying out the invention can be practiced without departing from the scope of this invention.

BRIEF DESCRIPTION OF THE DRAWINGS

In the illustrative embodiment of the invention shown in the drawing, like reference numerals refer to the same structure throughout the several figures wherein.

DETAILED DESCRIPTION OF THE PREFERRED EMBODIMENT

Figure 2A:
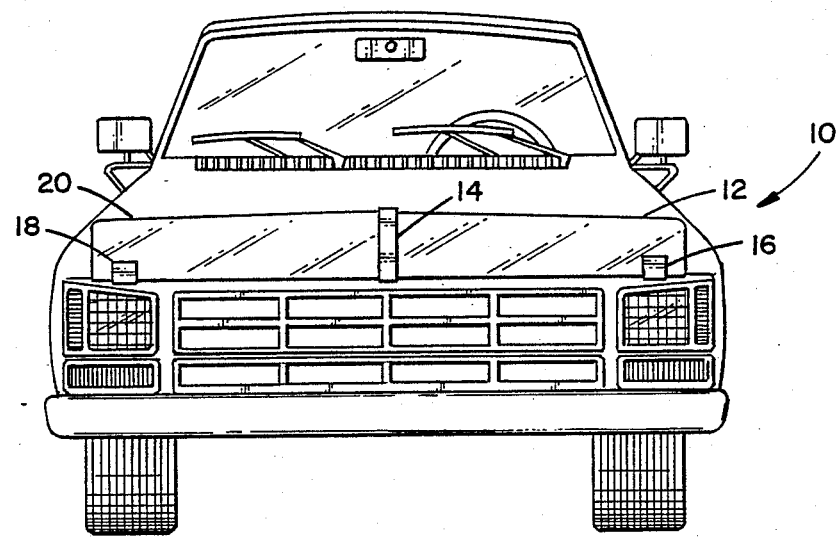
FIG. 2A is a front elevation showing the airflow deflector apparatus mounted at the front of a vehicle in the open position.

The purpose of an airflow deflector is to deflect road debris and spray over the windshield of the vehicle when road and weather conditions make this desirable. In FIG. 2A the airflow deflector of the present invention is shown in an open or operating position. The deflector generally designated as 10 is mounted to the hood 12, through the use of a center hinge 14. A pair of laterally located side hinges shown as 16 and 18 also cooperate to retain the wing members 20 and 22 of the deflector. The side hinges themselves are coupled to the hood 12. Wing members 20 and 22 are retained by, and attached to the lateral hinges 16 and 18.

Figure 1:
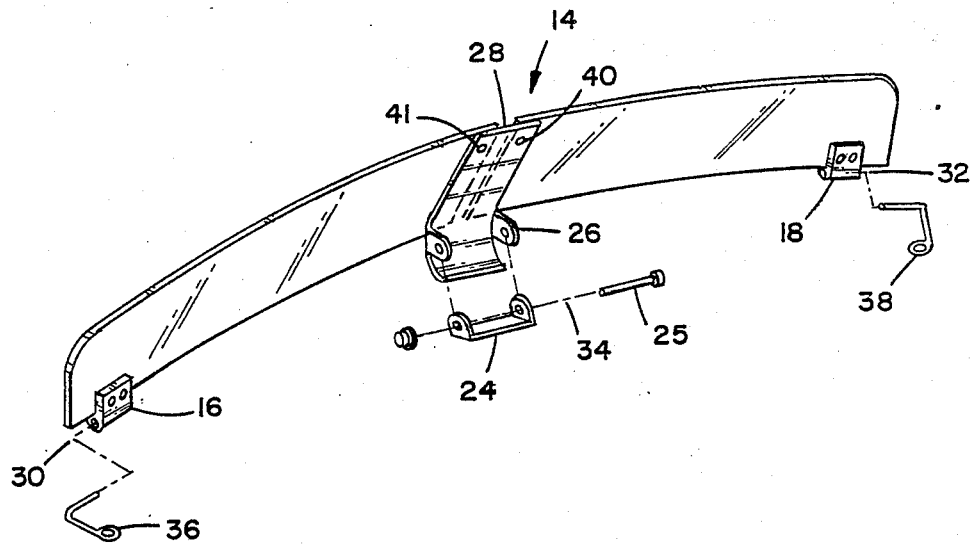
FIG. 1 is a perspective view of a simplified embodiment of the invention in exaggerated scale to show the hinge structures and their interaction.
Figure 2B:
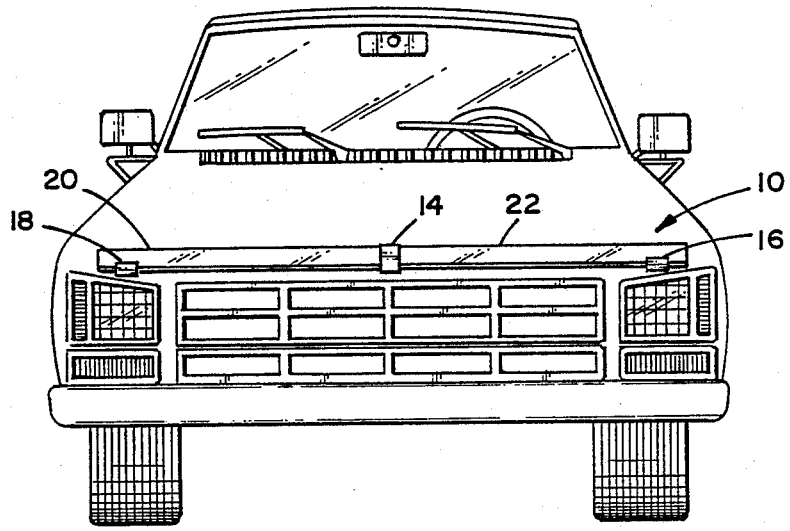
FIG. 2B is a front elevation showing the airflow deflector apparatus mounted at the front of a vehicle in the closed position.

The deflector assembly may be rotated down into substantial conformity with the surface of the hood as shown in FIG. 2B. This is referred to as the closed position through the specification. In this closed position the wing members 20 and 22 are removed from the airflow and offer reduced air drag. Flexible retention of the wing members is provided by the hinge structures to permit the airflow deflector apparatus to rotate through the full range of motion between the open and closed position. Clamping structures are also provided to permit the deflector wings to be secured in the open or erected position and the closed position. An example of one suitable clamping structure is shown in FIG. 1.

Turning to FIG. 1 there is shown a center hinge made up of a center hinge mounting bracket 24 and a cooperating friction surface 26 formed on the center hinge support 28. A pinch bolt 25 assembly passing through apertures formed in the bracket 24 and the support 28 can be adjusted to provide frictional engagement to secure the deflector wings in a rotated position. Other structures may be adapted to perform this function as well, without departing from the scope of this invention.

The perspective view of the airflow deflector in FIG. 1 shows several features of the invention in exaggerated scale to more clearly disclose and describe the invention. The Figure shows that pivot axis 30 of side hinge 16 does not lie on the same line as pivot axis 32 of side hinge 18. It is also important to note that the pivot point for the center hinge 14 shown as 34, does not lie on the same plane as pivots 32 and 30.

As a consequence of this geometry the wing members 20 and 22 will forced to move along the axles 36 and 38 provided by side hinges 16 and 18. To permit this operation the wings must be free to rotate slightly on the pivots 41 and 40 provided on the support 28. The exact orientation of the hinge assemblies is dictated by the shape of the vehicle hood on which the airflow detector is mounted. The hinges themselves must be adapted to be mounted on a variety of hood surfaces. Likewise the hinge structures must provide for the resilient retention of the wing members. The structures shown in FIG. 1 meet this requirement. However, other structures may be adopted for use without departing from the scope or spirit of the present invention.

What is claimed is:

1. Airflow deflector apparatus adapted to be mounted on the hood of a vehicle comprising:
    first and second wing means for deflecting airflow;
    a center hinge means, coupled to said wing means, for permitting said wing means to be rotated into a collapsed position in substantial conformity with said hood, and for permitting said wing means to be rotated into an erected position to deflect airflow over said hood,
    first and second side hinge means defining first and second hinge axis, said hinge means being coupled to said wing means for permitting rotational and longitudinal movement of each of said wing means relative to a respective one of said first and second axis.

2. The airflow deflector apparatus of claim 1 wherein said center hinge means further comprises:
    a center hinge mounting bracket adapted to be coupled to said hood,
    a hinge support having first pivot means for permitting rotation of said hinge support about a first axis defined by said mounting bracket, and having second pivot means adapted for connection to said wing means for permitting rotation of said wing means about a second axis.

3. The airflow deflector apparatus of claim 1 wherein said side hinge means further comprises:
    a side hinge mounting bracket adapted to be coupled to said hood, having an axle member,
    a side hinge clamp having a pivot for receiving said axle member defining one of said axes, wherein said side hinge clamp may rotate about said axle and may move longitudinally along said axle.

4. The airflow deflector apparatus of claim 1 wherein said center hinge means further comprises clamping means for securing said wing means in a fixed rotated position.

* * * * *